(12) United States Patent
Kassouni (10) Patent No.: US 10,166,711 B2
(45) Date of Patent: Jan. 1, 2019

(54) METHOD OF FORMING COMPOSITE HANDLE

(71) Applicant: Van M. Kassouni, Grand Rapids, MI (US)

(72) Inventor: Van M. Kassouni, Grand Rapids, MI (US)

(*) Notice: Subject to any disclaimer, the term of this patent is extended or adjusted under 35 U.S.C. 154(b) by 727 days.

(21) Appl. No.: 14/665,067

(22) Filed: Mar. 23, 2015

(65) Prior Publication Data

US 2015/0190958 A1     Jul. 9, 2015

Related U.S. Application Data

(63) Continuation of application No. 12/964,098, filed on Dec. 9, 2010.

(Continued)

(51) Int. Cl.
*B29C 47/00* (2006.01)
*B29C 70/70* (2006.01)

(Continued)

(52) U.S. Cl.
CPC .......... *B29C 47/0023* (2013.01); *B29C 70/70* (2013.01); *B32B 1/08* (2013.01);

(Continued)

(58) Field of Classification Search
CPC ... B29C 47/0023; B29C 47/20; B29C 47/022; B29C 47/02; B29C 47/0026;

(Continued)

(56) References Cited

U.S. PATENT DOCUMENTS

| 1,341,378 A | 5/1920 | McKenzie |
| 1,352,012 A | 9/1920 | McKenzie |

(Continued)

FOREIGN PATENT DOCUMENTS

| CA | 872891 | 6/1971 |
| EP | 0459193 | 12/1991 |

(Continued)

OTHER PUBLICATIONS

International Search Report and Written Opinion of corresponding PCT Application No. PCT/US2010/059665.

*Primary Examiner* — Robert J Grun
(74) *Attorney, Agent, or Firm* — Gardner Linn (57) ABSTRACT

A method of forming an elongated composite element includes providing an elongated tubular member and establishing a plurality of holes through an outer wall of the elongated tubular member. A polymeric resin is provided that comprises a curable material that, when uncured, comprises a fluid material and that, when cured, comprises a substantially rigid material. The uncured polymeric resin is extruded along the elongated tubular member, whereby the polymeric resin flows at least partially through the holes and is disposed within the inner cavity and at an outer surface of the outer wall of the elongated tubular member. The polymeric resin is cured to form the composite element whereby the cured polymeric resin limits flexing of the at least one elongated tubular member and the elongated composite element.

15 Claims, 9 Drawing Sheets

Related U.S. Application Data (60) Provisional application No. 61/302,772, filed on Feb. 9, 2010, provisional application No. 61/292,301, filed on Jan. 5, 2010.

(51) Int. Cl.

| | | |
|---|---|---|
| *B32B 1/08* | (2006.01) | |
| *B32B 3/30* | (2006.01) | |
| *B32B 5/18* | (2006.01) | |
| *B32B 27/00* | (2006.01) | |
| *B32B 29/00* | (2006.01) | |
| *B32B 37/00* | (2006.01) | |
| *B32B 5/20* | (2006.01) | |
| *B32B 7/04* | (2006.01) | |
| *B32B 15/04* | (2006.01) | |
| *B32B 15/08* | (2006.01) | |
| *B32B 27/10* | (2006.01) | |
| *B32B 27/26* | (2006.01) | |
| *B32B 3/26* | (2006.01) | |
| *B29C 35/00* | (2006.01) | |
| *B29C 47/02* | (2006.01) | |
| *B29C 47/20* | (2006.01) | |
| *B29C 47/28* | (2006.01) | |
| *B29C 53/48* | (2006.01) | |
| *B29K 105/04* | (2006.01) | |
| *B29K 105/08* | (2006.01) | |
| *B29L 23/00* | (2006.01) | |
| *B29L 31/46* | (2006.01) | |
| *B29C 47/06* | (2006.01) | |
| *B29K 101/00* | (2006.01) | |
| *B29L 22/00* | (2006.01) | |

(52) U.S. Cl.
CPC .............. *B32B 3/266* (2013.01); *B32B 3/30* (2013.01); *B32B 5/18* (2013.01); *B32B 5/20* (2013.01); *B32B 7/04* (2013.01); *B32B 15/046* (2013.01); *B32B 15/08* (2013.01); *B32B 27/00* (2013.01); *B32B 27/10* (2013.01); *B32B 27/26* (2013.01); *B32B 29/00* (2013.01); *B32B 29/007* (2013.01); *B32B 37/00* (2013.01); *B29C 35/00* (2013.01); *B29C 47/003* (2013.01); *B29C 47/0026* (2013.01); *B29C 47/0028* (2013.01); *B29C 47/0033* (2013.01); *B29C 47/02* (2013.01); *B29C 47/022* (2013.01); *B29C 47/067* (2013.01); *B29C 47/20* (2013.01); *B29C 47/28* (2013.01); *B29C 53/48* (2013.01); *B29C 2793/0018* (2013.01); *B29K 2101/00* (2013.01); *B29K 2105/04* (2013.01); *B29K 2105/08* (2013.01); *B29K 2105/0845* (2013.01); *B29L 2022/00* (2013.01); *B29L 2023/00* (2013.01); *B29L 2031/463* (2013.01); *B32B 2255/10* (2013.01); *B32B 2262/103* (2013.01); *B32B 2307/50* (2013.01); *B32B 2307/546* (2013.01); *B32B 2410/00* (2013.01); *Y10T 428/13* (2015.01); *Y10T 428/1307* (2015.01); *Y10T 428/249933* (2015.04)

(58) Field of Classification Search
CPC .......... B29C 47/28; B32B 5/20; B32B 15/08; B32B 15/046; B32B 3/266; B32B 1/08; B32B 5/18; B29L 2022/00; B29L 2023/00
See application file for complete search history.

(56) References Cited

U.S. PATENT DOCUMENTS

| | | | |
|---|---|---|---|
| 3,923,945 | A | 12/1975 | Humphries |
| 4,937,145 | A | 6/1990 | McReynolds |
| 5,419,600 | A | 5/1995 | Tisbo et al. |
| 5,787,588 | A | 8/1998 | Tisbo et al. |
| 5,826,929 | A | 10/1998 | Tisbo et al. |
| 5,826,930 | A | 10/1998 | Whitehead et al. |
| 5,951,078 | A | 9/1999 | Whitehead et al. |
| 5,983,504 | A | 11/1999 | Tisbo et al. |
| RE36,588 | E | 2/2000 | Tisbo et al. |
| 6,018,894 | A | 2/2000 | Whitehead et al. |
| 6,158,089 | A * | 12/2000 | Monahan ................ B25G 1/04 16/405 |
| 6,207,729 | B1 | 3/2001 | Medoff et al. |
| 6,619,727 | B1 | 9/2003 | Barz et al. |
| 7,018,142 | B2 | 3/2006 | Cooper |
| 7,118,145 | B1 | 10/2006 | Rosine et al. |
| 7,581,771 | B2 | 9/2009 | Rosine et al. |
| 2008/0014412 | A1 | 1/2008 | Hortnagl et al. |

FOREIGN PATENT DOCUMENTS

| | | |
|---|---|---|
| EP | 0531667 | 3/1993 |
| JP | 02134233 | 5/1990 |
| WO | WO9418820 | 9/1994 |
| WO | WO9602385 | 2/1996 |

\* cited by examiner

METHOD OF FORMING COMPOSITE HANDLE

CROSS REFERENCE TO RELATED APPLICATIONS

The present application is a continuation of U.S. patent application Ser. No. 12/964,098, filed Dec. 9, 2010, which claims the filing benefit of U.S. provisional applications, Ser. No. 61/302,772, filed Feb. 9, 2010, and Ser. No. 61/292,301, filed Jan. 5, 2010, which are hereby incorporated herein by reference in their entireties.

FIELD OF THE INVENTION

The present invention relates generally to tubular constructions, such as elongated handles for tools, such as for brooms or shovels or the like.

BACKGROUND OF THE INVENTION

Elongated handles, such as for brooms or shovels or the like, are typically made of a single material, such as wood or plastic or metal. The material is formed to the desired elongated tubular shape to form the handle. While such handles work well for their intended uses, there are strength concerns with molded or extruded plastic or polymeric tubular handles.

SUMMARY OF THE INVENTION

The present invention provides an elongated composite tubular or cylindrical member, such as for a tool handle or the like. The composite construction includes strengthening means or elements that provide enhanced strength to the elongated composite element or handle. For example, the composite construction may include a tubular shell or rolled element that has a plurality of holes or apertures formed therethrough, with a flowable material, such as a molten or liquid polymeric material or resin or foam or foaming material, established in the shell and substantially filling the shell and filling the holes or apertures formed through the shell to form a unitary construction composite elongated member. Optionally, the strengthening means may comprise one or more elements having indentations, such as dents or holes or the like, formed therealong, or may comprise a plurality of fibers or elements that may interconnect or link during the molding or extruding process and that may be securely linked together in the composite element when the polymeric core material cures and hardens. Optionally, the strengthening means may comprise a plurality of layers of differing materials, such as alternating layers of paper and plastic materials, to provide enhanced strength of the finished composite member or product.

According to an aspect of the present invention, a method of forming an elongated composite element comprises providing at least one elongated member and establishing a plurality of indentations at an outer surface of the elongated member. A polymeric resin is extruded along the elongated member, whereby the polymeric resin is at least partially received in the indentations to adhere the polymeric resin to the elongated member. The polymeric resin is cured to form the composite element whereby the cured polymeric resin limits flexing of the elongated member and the elongated composite element.

Optionally, the elongated member may comprise one or more elongated elements or wires having a plurality of indentations (such as notches or the like) formed at an outer surface of the elongated wire or wires. Optionally, the elongated wire may comprise at least three (such as, for example, five or more or less) elongated wires.

Optionally, the elongated member may comprise an elongated tubular member having an inner cavity. The extrusion of a polymeric resin may comprise extruding a polymeric resin within the inner cavity of the elongated tubular member. The plurality of indentations may comprise a plurality of holes established (such as via a press or stamping process or the like) through a wall of the elongated tubular member. The polymeric resin may be extruded within the inner cavity such that some of the polymeric resin flows at least partially through the holes. The method may further comprise applying an outer layer over the filled elongated member.

Optionally, the polymeric resin may be substantially continuously extruded along the elongated member as the elongated member is substantially continuously fed through an extruder. The method may further comprise cutting the elongated member and the polymeric resin to form a plurality of elongated composite elements.

Optionally, the elongated member may comprise a solid or non-tubular member and/or may comprise a plurality of indentations established at or in its outer surface, whereby the core material may be disposed over the elongated member and may be received in the indentations to strengthen the elongated member and limit flexing thereof.

Optionally, an elongated composite element may comprise a plurality of strengthening elements and a polymeric core portion disposed along and over the strengthening elements. The polymeric core portion may be at least partially received in and around the strengthening elements, and the polymeric core portion limits flexing of the plurality of strengthening elements and the elongated composite element. The strengthening elements may comprise a plurality of metal strands or fibers, such as steel wool or the like. Optionally, the strengthening elements may comprise a plurality of small elements having hooks or protrusions protruding outwardly therefrom to join or hook to hooks or protrusions of others of the plurality of strengthening elements to establish a network of strengthening elements in the polymeric core portion. Optionally, the strengthening elements may comprise metallic elements or may comprise polymeric elements having a melting temperature that is greater than the melting temperature of the polymeric core portion.

Optionally, an elongated composite element may comprise a plastic or polymeric core portion and alternating layers of a plastic or polymeric material and a non-plastic material, such as, for example, paper or metal or the like. For example, an elongated composite element may comprise a polymeric core portion with a first layer of paper around and along the core portion and a first layer of plastic around and along the first paper layer, and with a second layer of paper around and along the first plastic layer and a second plastic layer around and along the second paper layer, and so on, with the alternating paper and plastic layers being repeated a desired or selected or appropriate number of times to achieve the desired or selected diameter of the elongated composite element and/or the desired or selected strength of the elongated composite element. The outermost polymeric layer may provide the outer surface of the finished elongated composite element, or optionally an additional polymeric layer or coating may be applied to provide the desired outer surface color and/or texture and/or finish for the finished elongated composite element or product.

Therefore, the present invention provides a composite elongated member, such as an elongated handle for a tool or the like. The composite construction comprises a strengthening portion or element or means, such as a paper or metallic tubular member or members or wire member or members or linking elements or the like, while the polymeric core portion is disposed within and/or around and along the strengthening portion, whereby the interaction between the polymeric portion and the strengthening portion results in a substantially strong and non-flexible elongated handle or the like. The strengthening portion or element may comprise an elongated member with holes established therethrough (such as for a tubular strengthening portion made of paper or metal or plastic or the like) and/or indentations or notches established at a surface thereof (such as for metallic wires or the like).

These and other objects, advantages, purposes and features of the present invention will become apparent upon review of the following specification in conjunction with the drawings.

DESCRIPTION OF THE PREFERRED EMBODIMENTS

Figure 1:
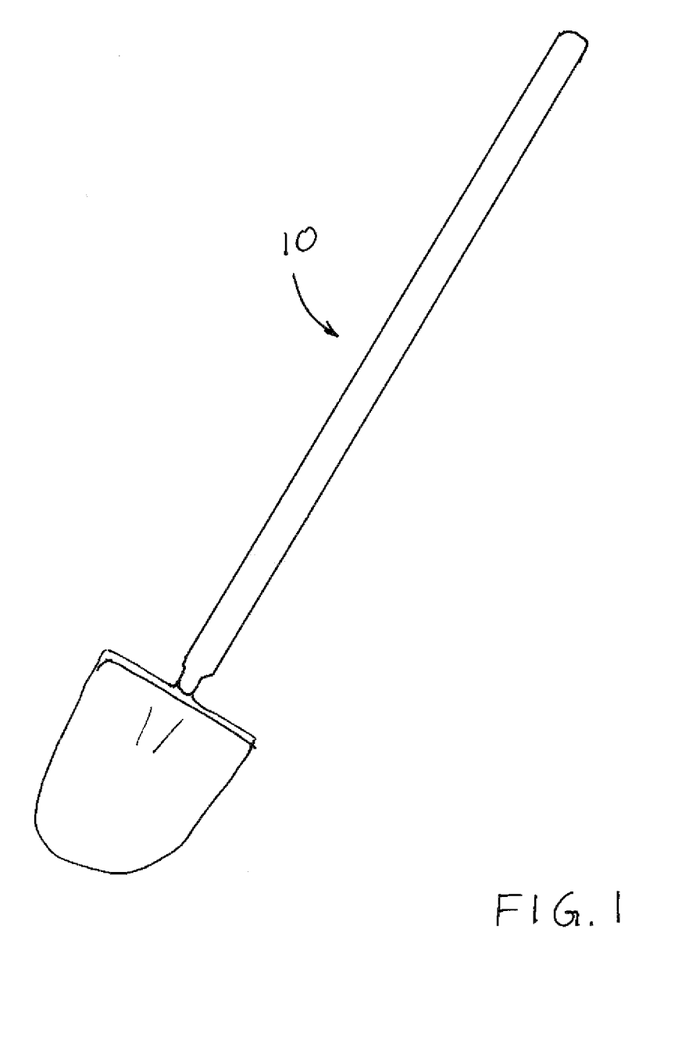
FIG. 1 is a perspective view of a tubular handle formed in accordance with the present invention, shown attached to a shovel head.

Referring now to the drawings and the illustrative embodiments depicted therein, an elongated tubular element 10, such as elongated handles for tools, such as for brooms or shovels (FIG. 1) or such as for other elongated structures, such as fence posts or the like, includes a shell or strengthening portion 12 and a plastic or polymeric or core portion 14 established within and/or partially through and/or around the shell portion 12, as discussed below. An outer layer or finish portion 16 may be established over the shell portion 12 and core portion 14 to provide the desired outer surface of the elongated tubular element 10, as also discussed below. Optionally, the shell portion may comprise a tubular portion with the polymeric core portion disposed therewithin or the shell or strengthening portion may comprise one or more wires extending within and along the polymeric core portion, whereby the core portion and the shell portion cooperate to provide enhanced strength of the elongated element while limiting flexibility of the elongated element or handle, as also discussed below.

Figure 2:
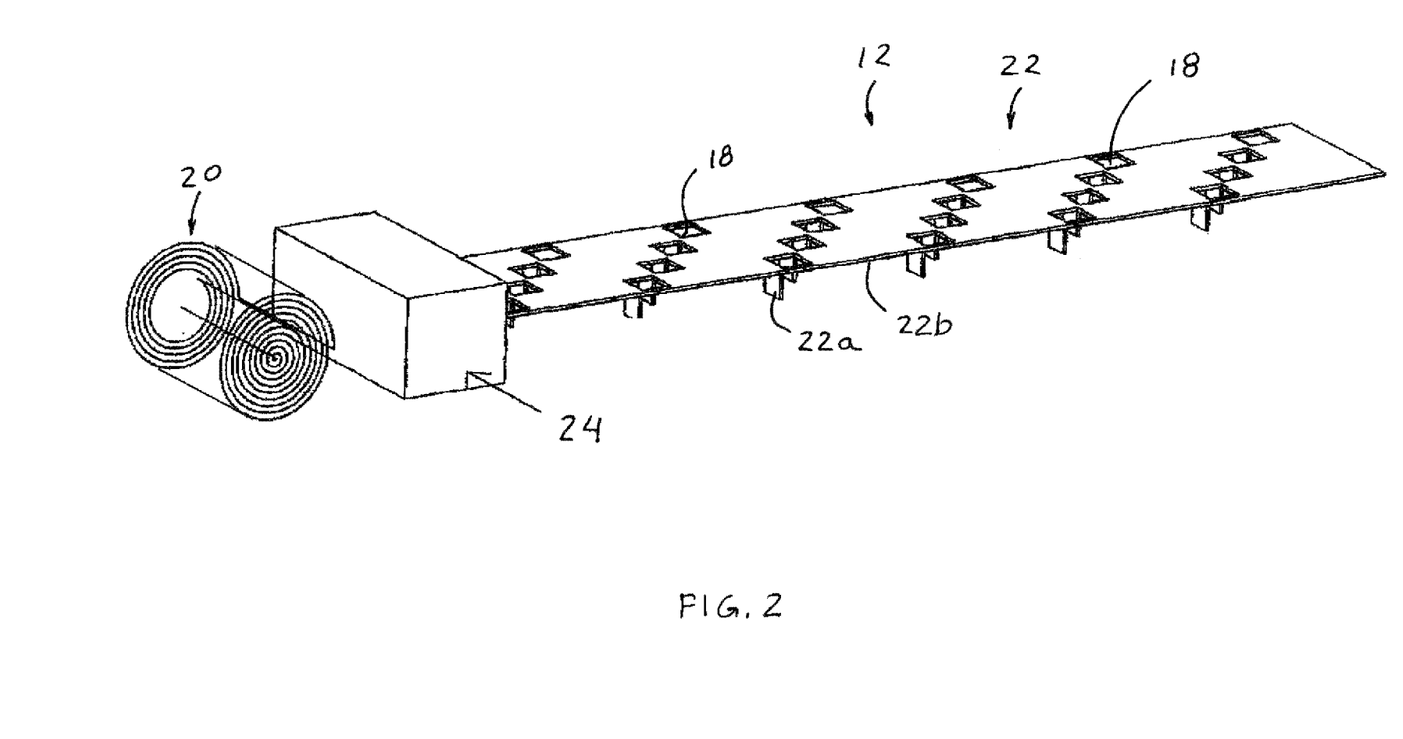
FIG. 2 is a perspective view of a punch press that punches holes in a rolled material during the process of forming the tubular handle of the present invention.
Figure 3:
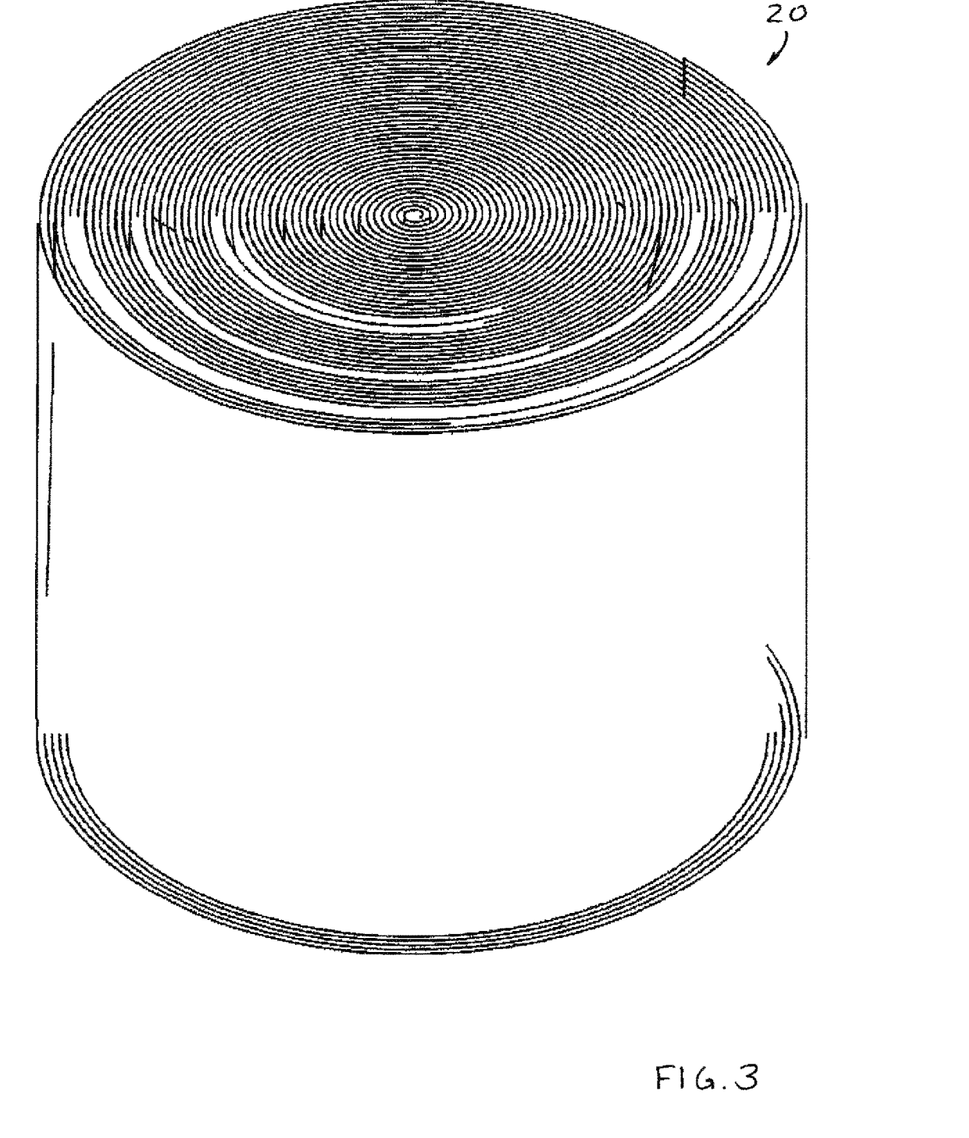
FIG. 3 is a perspective view of a roll of steel or paper or the like that is fed into the punch press of FIG. 2.

In the illustrated embodiment, and as shown in FIGS. 2-5, shell portion 12 comprises a flexible material that may have a plurality of holes or apertures 18 formed therethrough and that may be formed to a generally tubular or cylindrical (or other tubular shape) shape. In the illustrated embodiment, the shell portion 12 is provided as a coiled sheet 20 of flexible material (FIGS. 2 and 3), such as a coiled metallic material, such as steel or aluminum or the like, or a coiled paper material or cardboard material or the like, or a polymeric or metallic screen or mesh material or the like (or any suitable substrate or reinforcement material), whereby the coiled sheet is uncoiled to form an elongated strip or ribbon or portion or sheet 22 for forming into the tubular shape. For example, and as shown in FIG. 2, the coiled sheet 20 may be uncoiled and the uncoiled strip or ribbon 22 may be fed into a punch press or piercing device or other hole or indentation establishing means 24, which is operable to punch (or otherwise form or establish) holes or apertures 18 through the elongated strip 22. As shown in FIG. 2, the apertures may be punched so that portions or tabs 22a of the strip protrude from an inner side or surface 22b of the strip 22. Optionally, a steel substrate may be stretched to a desired length and width (for example, a 4 inch plate steel may be stretched to have a 2.5 inch width and then may be used as the elongated strip that is punched to have the apertures established therethrough and that may be rolled or coiled.

Figure 4:
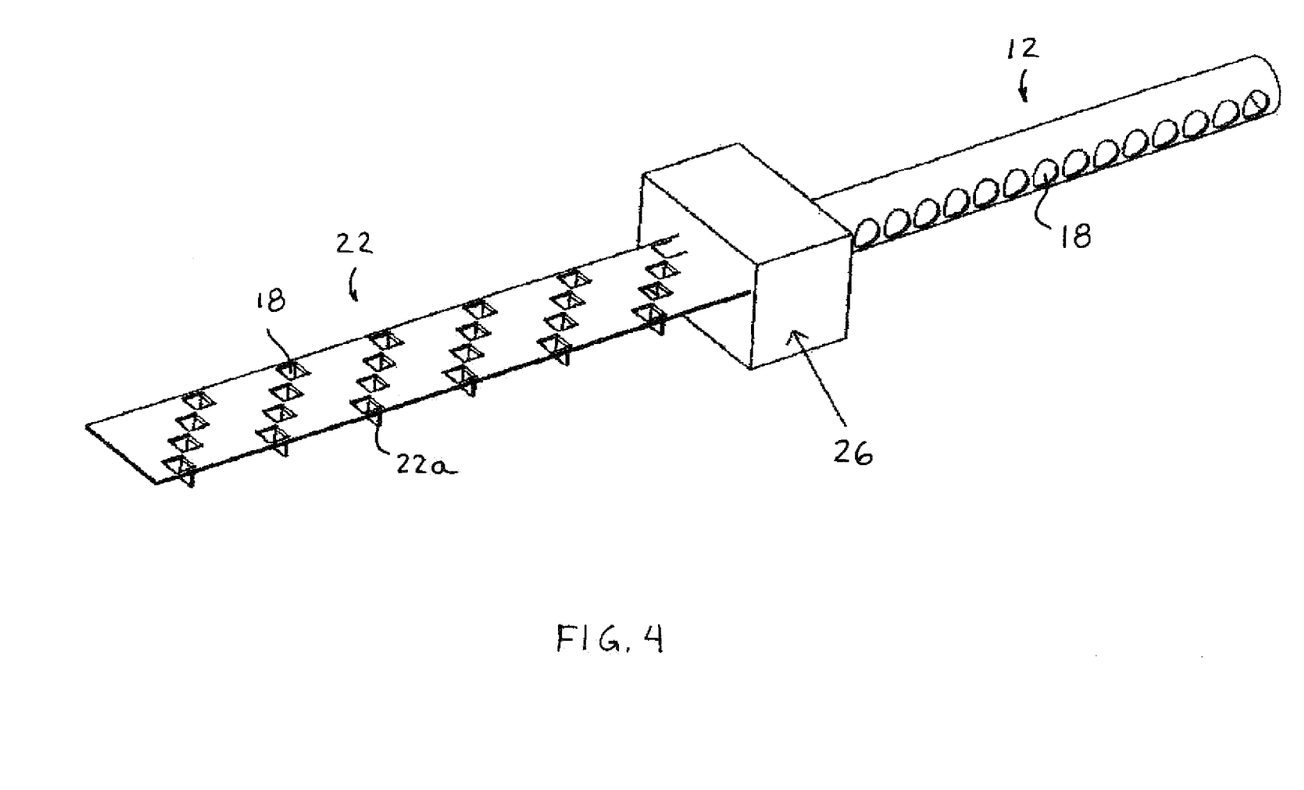
FIG. 4 is a perspective view of a roll former that rolls the punched material to form a generally tubular shell during the process of forming the tubular handle of the present invention.
Figure 5:
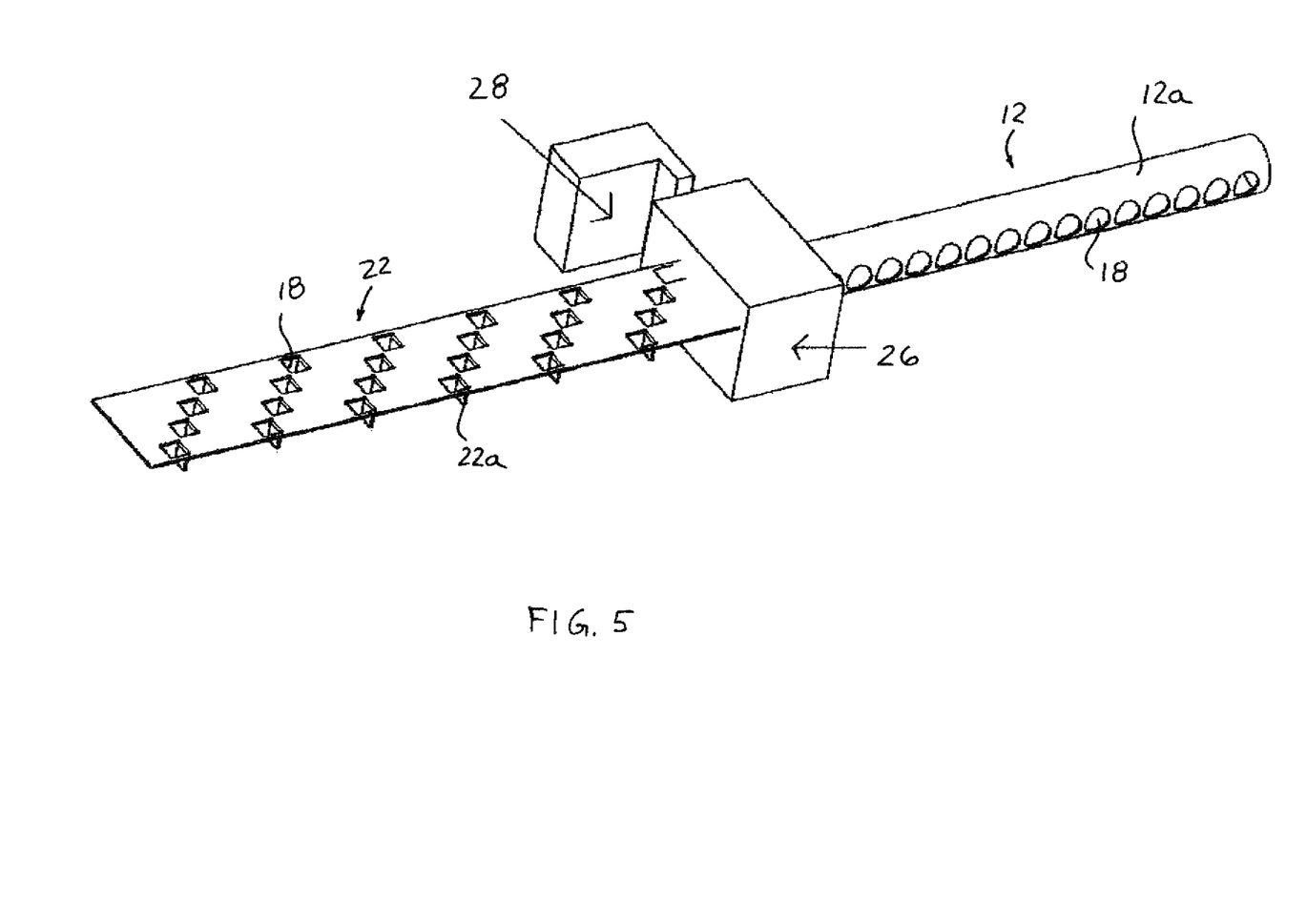
FIG. 5 is another perspective view of a roll former, shown with an extruder that extrudes a foam or polymeric material into the rolled and punched shell in accordance with the present invention.

As shown in FIG. 4, the punched strip 22 may be fed to a roll former 26, which is operable to roll the generally planar strip 22 into a hollow tubular form or shell portion 12, with the portions 22a of the strip 22 at the apertures 18 protruding radially inward into or partially into an inner cavity established within and along the tubular form or shell portion 12. Optionally, the strip may be otherwise formed to its tubular shape via other forming means, such as dies or other manipulating means at the cross head of the extruder that extrudes the core material, as discussed below, whereby the manipulating means or dies or the like may manipulate or form the strip to the desired shape at or in the cross head of the extruder. Although the apertures are shown in FIG. 4 as being generally rectangular-shaped as the strip is fed into the roll former and generally circular-shaped after the strip is formed to its tubular shape, this is not intended to show that the holes are modified by the roll former to change the shape of the holes, but rather is to demonstrate that the holes may be formed in different shapes (such as circular or non-circular shapes) while remaining within the spirit and scope of the present invention.

Figure 6:
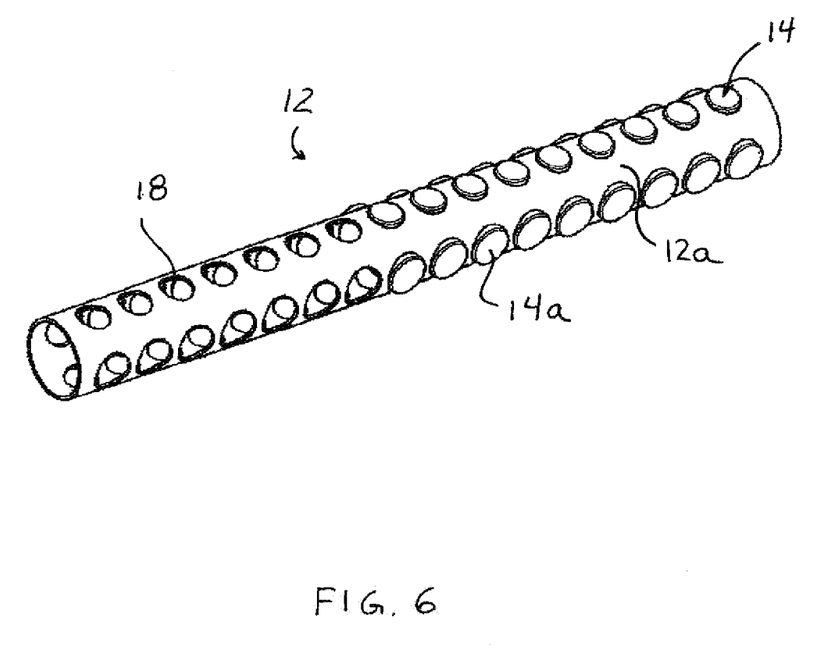
FIG. 6 is a perspective view of the rolled and punched shell, shown with part of the shell having the extruded core material therein and protruding from the punched holes.

During forming of the tubular form or after the strip is formed to its tubular or cylindrical shape, a core material or portion 14 (such as a polymeric or plastic resin material with a foaming agent or the like) may be established within the inner cavity of the tubular form or shell portion 12 and fills or partially fills or substantially fills the inner cavity. The plastic or polymeric material or materials may comprise any suitable material, such as, for example, low cost plastic material such as recycled plastic bottles or the like. For example, and with reference to FIG. 5, an extruder 28 may be disposed at or near the roll former 26 and may be operable to extrude a plastic liquid or resin material into the inner cavity of the rolled form or shell portion 12 as the strip 22 is formed to its generally tubular form or shape. The resin material or core portion 14 may foam or expand (such as while the filled shell moves along the production line) so that the plastic material oozes or flows through or fills or protrudes outwardly at least partially through the apertures 18 and may protrude outwardly beyond an outer surface 12a of the tubular form or shell portion 12. For example, and with reference to FIG. 6, the tubular shell 12 may leave the roll former 26 and extruder 28 with the tabs 22a bent inward or extending inward (or the tabs may be removed or may be otherwise not present if desired) and with the core material 14 substantially filling the inner cavity of the tubular shell 12 and substantially encompassing or enveloping the tabs 22a and expanding within the tubular shell and having portions 14a protruding outward through the apertures 18 of the shell portion 12. The portions 14a of the core portion 14 substantially lock or secure or retain the core portion relative to the shell portion to limit movement of or flexing of or compression of the shell portion, thereby providing an elongated tubular element with enhanced strength over conventional molded or extruding plastic handles.

Optionally, the indentations or holes at or in the shell portion or substrate or strip that forms the shell portion may be established via any suitable means. For example, the holes may be established by piercing a substrate or formed strip or tubular shell and stretching the pierced substrate or strip or shell a desired or appropriate amount to form the desired length strip or shell and to stretch or open the pierced slits to establish holes through the wall or walls of the tubular shell. Optionally, for example, a shell portion suitable for use in making a composite tubular element in accordance with the present invention may be formed by weaving fibers or wires or the like to form a woven tubular element having a plurality of holes defined by the spacings between adjacent fibers or wires. After the core material is extruded or disposed in and along the woven fibers (with the material flowing between the fibers and through gaps between the fibers), the core material, after it has cured and hardened, limits or substantially precludes relative movement between the individual fibers. Implementation of such piercing and/or weaving processes may substantially reduce the punch scrap and waste of the shell material during the manufacturing processes, and thus may reduce the cost of the finished product. The woven or pierced or otherwise formed tubular element or mesh tubular element may be filled or partially filled with a core material to construct the elongated composite element.

Optionally, it is envisioned that the tubular element may have a hollow or partially filled core portion. For example, the extruder may extrude the core material inside the elongated tubular shell and establish a hollow core portion with a hollow cavity or passageway within and along the formed tubular element. Optionally, it is further envisioned that two or more different diameter tubular elements formed in accordance with the present invention may be assembled together to form a telescoping tubular construction or handle assembly. For example, a larger diameter tubular element may slidably or movably or adjustably receive a smaller diameter tubular element therein (with an outer diameter of the smaller element being slightly smaller or generally equal to the inner diameter of the cavity or passageway formed along the larger element) to provide an adjustable length handle assembly or the like.

Figure 7:
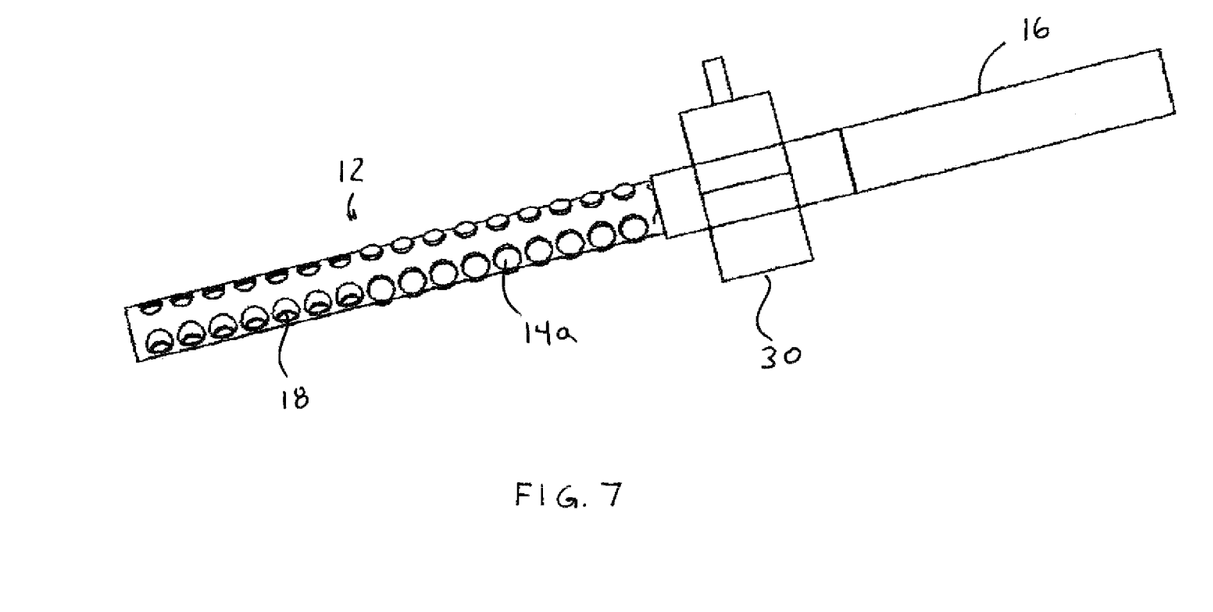
FIG. 7 is a perspective view of another extruder that applies an outer finish to the formed and extruded shell and core during the process of forming the tubular handle of the present invention.

In order to provide a substantially smooth or uniform outer surface to the tubular element or handle 10, an outer coating or surface portion 16 is established over and around and along the tubular shell portion 12 and core material 14 (including outwardly protruding portions 14a). For example, and with reference to FIG. 7, a cross head extruder 30 may be provided that extrudes or applies the outer coating or portion 16 to the core filled shell as the shell portion passes through the extruder. Thus, the core portion 14 and filled shell portion 12 may enter the cross head extruder 30, which then applies the final finish or coating or portion 16 to the core filled shell. The outwardly protruding portions provide additional surfaces for the outer coating 16 to bond or adhere to as the outer coating is coated over the shell and core portions and cures to its cured state.

The coiled flexible material may be substantially continuously uncoiled and fed to the punch press, which punches holes as the material or strip is fed through. The punched strip may be substantially continuously fed to the roll former and extruder (such as at a rate of, for example, 1 foot per second or faster or slower depending on the particular application), whereby the strip is formed to its tubular shape and the core material is extruded therein in a substantially continuous manner. Likewise, the filled tubular form may be substantially continuously fed to the extruder that applies the outer portion to cover the filled tubular form in a substantially continuous manner (which may be applied or extruded while the core material is oozing out through the apertures in the tubular member). A plurality of handles or elements may then be cut at the end of the production process to establish the desired length handles (or other forms) while the materials are fed and punched and extruded in a substantially continuous manner.

The composite element or handle may be formed via any suitable forming process. For example, a method of forming an elongated composite element may include providing a sheet or ribbon or coil of flexible material (such as metal, paper or any suitable flexible substrate or reinforcement material that may be coiled or otherwise provided for feeding into an extruding device or the like). The method may include establishing a plurality of holes (such as via punching or stamping or piercing or otherwise forming holes or indentations, where tabs of material of the flexible sheet may protrude at the holes) in and along a sheet of flexible material and forming the sheet of flexible material into an elongated tubular form (such as via a roll former or dies or the like that bend or shape the strip or ribbon into an elongated tubular form. The elongated tubular form is at least partially or substantially filled (such as via extrusion) with a core material (such as a polymeric resin or the like that is flowable or liquid in its uncured state) that at least partially or substantially fills an interior cavity of the elongated tubular form and that protrudes at least partially through the holes established in the elongated tubular form. The core material may comprise a polymeric core material with a foaming agent so that the polymeric material expands during and after extrusion to flow into and at least partially through the holes so that a portion of the core material may protrude outward from the outer surface of the elongated tubular form. Optionally, an outer portion may be formed over and around the elongated tubular form and the core material to establish an outer layer of the composite element. The outer portion may be extruded over and around the elongated tubular form and the core material.

Thus, the present invention provides an elongated handle and method of making an elongated handle that comprises a plastic reinforced handle. The plastic or polymeric filler or core portion is established at and within a substantially non-compressible substrate or shell portion (such as a paper or cardboard or metal shell or the like). Such an elongated element provides enhanced strength and can be manufactured at reduced costs compared to conventional plastic or metal handles. The shell may be formed to a tubular shape via any forming means and may be fed to a filling device (such as an extruder or the like) that fills the shell with the polymeric resin of the core portion, and the filled shell may then be fed into another extruder or device that applies an outer portion or coating over the filled shell, and the outer portion may be applied while the core material still oozes or foams or expands through the apertures of the shell portion. Such a reinforced plastic handle (or other elongated element) may be manufactured as a continuous or generally continuous element that may be cut to the desired lengths at the end of the process after the outer portion is established over the filled shell.

Figure 8:
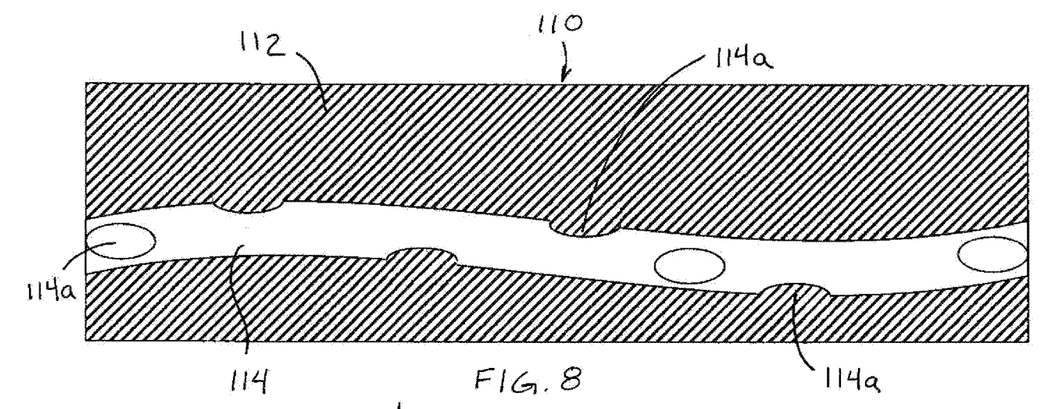
FIG. 8 is a sectional view of an elongated element or handle formed in accordance with the present invention.
Figure 9:
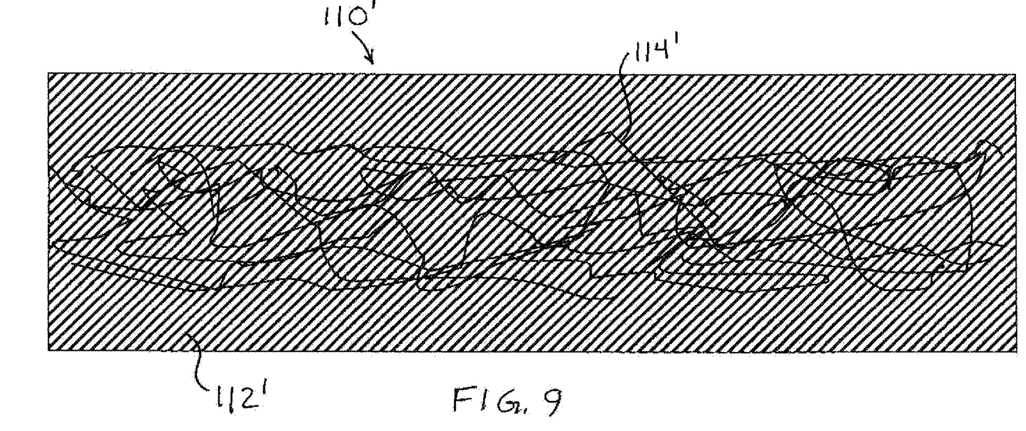
FIG. 9 is a sectional view of another elongated element or handle formed in accordance with the present invention.

Optionally, a reinforced elongated tubular element may be formed with a polymeric resin established at and along a plurality of wires or strands of wire or cables, where the wires may be disposed within the shell portion or may replace the shell portion and provide enhanced strength and reduced flexibility of the elongated element. For example, a plurality of wire strands (such as five or more or less) may be uncoiled from respective coils and may be fed into an extruder or other molding or extruding device. The extruder extrudes the plastic or polymeric resin around the wire strands with the wire strands extending generally along and within the extruded element (such as generally along a center portion of the extruded element). Optionally, and desirably, and as shown in FIG. 8, the wire strand or strands 114 of a composite element or handle 110 may be notched or roughened or otherwise processed so that their outer surfaces have a plurality of indentations or notches or recesses 114a or the like established thereat, whereby the polymeric resin 112, when established around the wire strands (only one shown in FIG. 8, but the element or member could have two or more strands extending therein and therealong), fills or substantially fills the notches to further secure or attach or adhere or bond the shell material to the strands, thereby limiting or substantially reducing the flexibility of the wire strands and the flexibility of the finished elongated element. In such an application, the shell portion may provide the desired outer surface and the additional process of applying an outer coating may be obviated. Thus, multiple spools of wire or cable (such as steel wire or other metallic wire or the like) may be uncoiled and processed to establish the indentations or notches (such as via any suitable notching means) and fed into an extruder, and the plastic resin material may be extruded over and around the wires (which may first be processed to establish notches or the like at their outer surfaces) as the wires are fed through the extruder in a generally continuous manner, whereby the elongated composite element may be cut to the desired length after the extruding process and before or after the polymeric resin material cures to its fully cured state. The wires may be arranged generally parallel to one another along the elongated element or the wires may be wound or twisted together along the elongated element, while remaining within the spirit and scope of the present invention.

Figure 10:
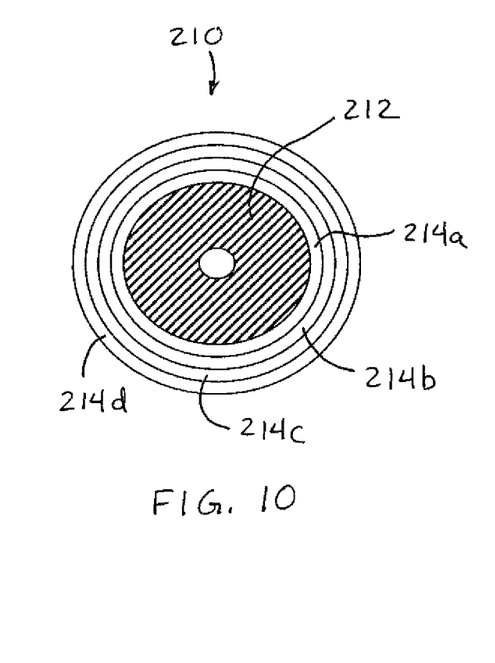
FIG. 10 is a sectional view of another elongated element or handle formed in accordance with the present invention.

Optionally, it is envisioned that the strengthening material may comprise any suitable strands of fibers or metal or the like and that the strands or fibers may be any suitable shape. For example, and as shown in FIG. 10, the strengthening material 114' may comprise steel wool or the like that is formed in a desired elongated shape or form (such as an elongated cylindrical form or the like). The polymeric resin material 112' may be extruded along the elongated steel wool form and may penetrate or impregnate the steel wool form to establish or form an elongated polymeric tubular form 110' with a plurality of close knit or intertwined metallic strands or fibers 114' disposed therein. The polymeric resin material 112', when in its liquid state, may readily impregnate the steel wool form to fill in the elongated shape, while the steel wool fibers provide enhanced strength and reduced flexing of the elongated shape after the polymeric material cures or hardens. Optionally, an outer polymeric coating material (or other suitable coating material) may be applied over and along the outer surface of the polymeric/steel wool elongated form to provide a smooth or desired exterior surface finish to the completed product.

Optionally, other means for strengthening an elongated polymeric form may be implemented while remaining within the spirit and scope of the present invention. For example, and with reference to FIG. 10, an elongated composite element or structure 210 may include a central core portion or material 212 (which may be a solid construction or may be hollowed construction or the like) with multiple layers of materials disposed around and along the core portion 212. In the illustrated embodiment, the elongated composite element 210 includes a first overlayer 214a (such as a first layer of paper or the like) disposed or wrapped around and along the core portion 212, a second overlayer 214b (such as a first plastic or polymeric layer or the like) disposed or established or extruded around and along the first overlayer 214a, a third overlayer 214c (such as a second layer of paper or the like) disposed or wrapped around and along the second overlayer 214c, and a fourth overlayer 214d (such as a second plastic or polymeric layer or the like) disposed or established or extruded around and along the third overlayer 214c. The composite element thus may have alternating layers (such as layers of paper and plastic or the like) disposed or established along and around the core portion to provide enhanced strength to the composite element. The outermost layer (such as fourth overlayer 214d in FIG. 10) may provide the outer surface of the finished composite element or structure or product, or a final outer finish surface layer may be disposed over and along the outer overlayer to provide the desired or selected outer surface finish and/or texture and/or color or the like to the finished product or element.

Figure 11:
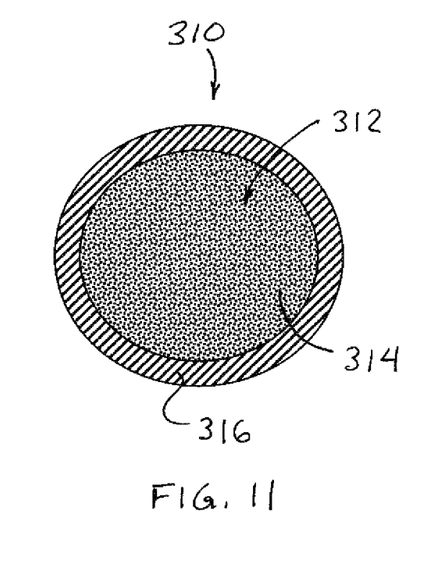
FIG. 11 is a sectional view of another elongated element or handle formed in accordance with the present invention.

Optionally, other strengthening means or elements may be disposed in an elongated polymeric form while remaining within the spirit and scope of the present invention. For example, and as shown in FIG. 11, an elongated composite form 310 may include a polymeric core portion 312 that has a plurality of strengthening elements or material 314 disposed therein. The strengthening material or elements 314 may comprise a plurality of small metallic or plastic elements that have hooks or protrusions that function to hook together with the hooks or protrusions of other ones of the metallic or plastic elements to establish a mesh or network of connected elements disposed within a liquid polymeric resin. The elements may comprise small or micro-sized elements comprising a metallic material or a plastic material (such as a plastic material, such as an acrylic material or the like, that has a higher temperature melting point than that of the liquid polymeric resin in which the elements are disposed) with a plurality of micro-hooks or protrusions protruding outwardly therefrom. The hooks are configured to hook together with hooks of other elements when the elements are disposed in a liquid polymeric resin (and where the resin and elements may be mixed prior to extruding or injecting the resin into the forming means). The elements may be generally flat elements with hooks or protrusions extending radially outwardly therefrom in generally the same plane, or the elements may be more three-dimensional (such as spherical or the like) and may hooks or protrusions extending in multiple directions therefrom and in multiple planes The resin material (with the elements disposed therein) may be extruded to form the desired elongated shape (or may be injection molded into a mold cavity to form a desired shape) and then cured and hardened. Thus, when the micro-elements are mixed in or disposed in a liquid polymeric resin, the elements may join together to form a network or mesh of metallic or plastic elements that mechanically strengthen the polymeric material when the polymeric resin material cures and hardens. Optionally, an outer polymeric coating material 316 (or other suitable coating material) may be applied over and along the outer surface of the polymeric/joined elements elongated form to provide a smooth or desired exterior surface finish to the completed product.

Therefore, the present invention provides an elongated composite element or structure, such as for use as a handle for a shovel or rake or broom or other tool or the like, with enhanced strengthening elements or construction or means. The composite element or structure may have a plastic or polymeric core portion disposed or extruded at or along or over or in one or more elongated members, such as one or more wires or a tubular member, with the wires or tubular member having a plurality of indentations or holes established there at or therethrough. Optionally, the strengthening means may comprise multiple layers of paper and/or plastic formed or established along and around a core portion, or the strengthening means may comprise multiple elements disposed in the molded or extruded core portion (such as multiple strands or fibers or multiple hooked elements that join together or link while the core portion is in a liquid state and are retained together when the core portion cures).

Changes and modifications in the specifically described embodiments may be carried out without departing from the principles of the present invention, which is intended to be limited only by the scope of the appended claims as interpreted according to the principles of patent law.

The invention claimed is:

1. A method of forming an elongated composite element, said method comprising:
    providing an elongated tubular member having an outer wall and inner cavity that extends along the length of said elongated tubular member and between opposite wall portions of said outer wall of said elongated tubular member;
    establishing a plurality of holes through said outer wall of said elongated tubular member;
    providing a polymeric resin that comprises a curable material that, when uncured, comprises a fluid material and that, when cured, comprises a substantially rigid material;
    extruding uncured polymeric resin along said elongated tubular member, whereby said uncured polymeric resin flows at least partially through said holes and is disposed within said inner cavity and at an outer surface of said outer wall of said elongated tubular member; and
    curing said polymeric resin to form said composite element whereby said cured polymeric resin limits flexing of said at least one elongated tubular member and said elongated composite element.

2. The method of claim 1, comprising applying an outer layer over said elongated tubular member and at least partially over said polymeric resin that is at said outer surface of said elongated tubular member.

3. The method of claim 1, wherein extruding uncured polymeric resin comprises substantially continuously extruding uncured polymeric resin along said elongated tubular member as said elongated tubular member is substantially continuously fed through an extruder.

4. The method of claim 3, wherein, after curing said polymeric resin, said method further comprises cutting said elongated tubular member and said polymeric resin to form a plurality of elongated composite elements.

5. The method of claim 1, wherein providing an elongated tubular member comprises providing a sheet of flexible material and forming the sheet of flexible material into an elongated tubular form to form said elongated tubular member, and wherein establishing a plurality of holes comprises establishing a plurality of holes in the sheet of flexible material before forming the sheet of flexible material into the elongated tubular form.

6. The method of claim 5, comprising providing a roll of the sheet of flexible material and feeding the sheet of flexible material into a device to establish said plurality of holes through the sheet of flexible material.

7. The method of claim 6, wherein, after the holes are established in the sheet of flexible material, the sheet is fed into a roll former that rolls the sheet into the elongated tubular form.

8. The method of claim 5, wherein establishing said plurality of holes comprises punching holes in the sheet of flexible material, and wherein a portion of the sheet of flexible material at said holes protrudes into said interior cavity of said elongated tubular form when the sheet of flexible material is formed into said elongated tubular form to form said elongated tubular member.

9. The method of claim 8, wherein, when said polymeric resin is extruded within said inner cavity of said elongated tubular member, said polymeric resin substantially surrounds said portions of the sheet of flexible material.

10. The method of claim 5, wherein said flexible material comprises a metallic material.

11. The method of claim 5, wherein said flexible material comprises a paper material.

12. The method of claim 1, wherein said polymeric resin comprises a foaming agent.

13. The method of claim 1, wherein said polymeric resin provides a substantially uniform outer surface of said elongated composite element.

14. The method of claim 1, wherein said polymeric resin substantially fills said interior cavity of said elongated tubular member.

15. The method of claim 1, wherein said elongated composite element comprises an elongated handle for one of (i) a shovel, (ii) a rake and (iii) a broom.

* * * * *